US00RE45477E

(19) United States
(12) Reissued Patent
Higgins et al.

(10) Patent Number: US RE45,477 E
(45) Date of Reissued Patent: Apr. 21, 2015

(54) PAINTBALL DEVICE AND METHOD OF USE

(75) Inventors: John Higgins, Indianapolis, IN (US); Kelly Lewis, Indianapolis, IN (US)

(73) Assignee: HTR Development, LLC, Gotha, FL (US)

(21) Appl. No.: 13/415,502

(22) Filed: Mar. 8, 2012

Related U.S. Patent Documents

Reissue of:
(64) Patent No.: 7,673,627
Issued: Mar. 9, 2010
Appl. No.: 11/701,099
Filed: Feb. 1, 2007

U.S. Applications:
(60) Provisional application No. 60/766,648, filed on Feb. 2, 2006.

(51) Int. Cl.
*F41B 11/00* (2013.01)
*F41B 11/50* (2013.01)

(52) U.S. Cl.
CPC ..... *F41B 11/50* (2013.01)

(58) Field of Classification Search
USPC ..... 124/32, 49, 51.1, 73, 74
See application file for complete search history.

(56) References Cited

U.S. PATENT DOCUMENTS

| | | | | |
|---|---|---|---|---|
| 6,305,367 | B1 | 10/2001 | Kotsiopoulos | 124/49 |
| 6,418,919 | B1 | 7/2002 | Perrone | 124/49 |
| 6,467,473 | B1 | 10/2002 | Kostiopoulos | 124/51.1 |
| 6,481,432 | B2 | 11/2002 | Rushton | 124/49 |
| 6,488,019 | B2 | 12/2002 | Kotsiopoulos | 124/51.1 |
| 6,502,567 | B1 | 1/2003 | Christopher | 124/51.1 |
| 6,609,511 | B2 | 8/2003 | Kotsiopoulos | 124/51.1 |
| 6,644,293 | B2 | 11/2003 | Jong | 124/52 |
| 6,889,680 | B2 | 5/2005 | Christopher | 124/51.1 |
| 6,928,999 | B1 | 8/2005 | Hslao | 124/32 |
| 6,941,693 | B2 | 9/2005 | Rice | 42/71.01 |
| 7,921,835 | B2 * | 4/2011 | Campo et al. | 124/51.1 |
| 2005/0274371 | A1 * | 12/2005 | Lubben | 124/51.1 |
| 2008/0047536 | A1 * | 2/2008 | Chen | 124/51.1 |

* cited by examiner

*Primary Examiner* — John Ricci
(74) *Attorney, Agent, or Firm* — Woodard, Emhardt, Moriarty, McNett & Henry LLC

(57) ABSTRACT

The present invention discloses a device and method for wireless communication between a paintball marker or gun and it's associated paintball loading device. This wireless communication, whether bidirectional or unidirectional, allows for the transmission of "load" commands and various other useful information between the paintball marker and the paintball feeding device. When the "load" command, which is much more responsive than the "passive" communication found in the prior art, is wirelessly received by the paintball feeding device, the paintball feeding device loads a singular or plurality of paintballs into the paintball marker of appropriate conduit.

31 Claims, 1 Drawing Sheet

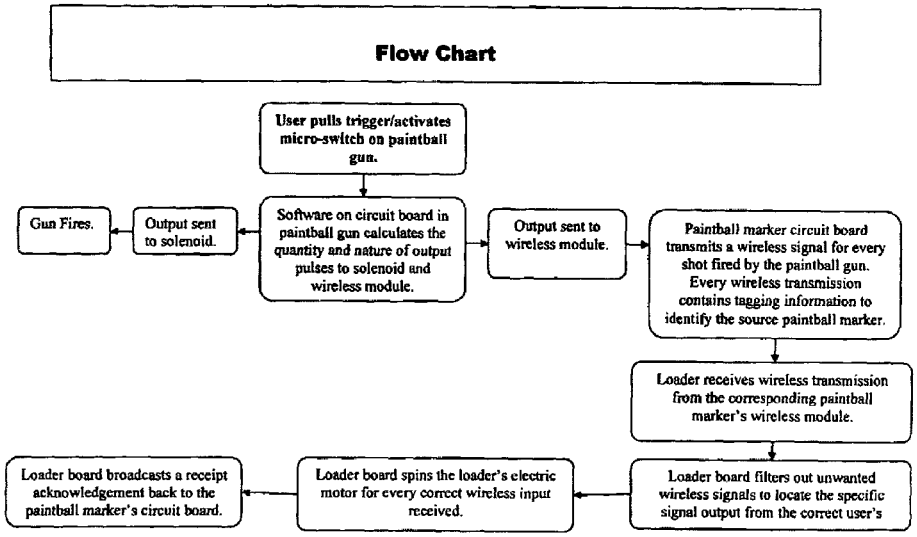

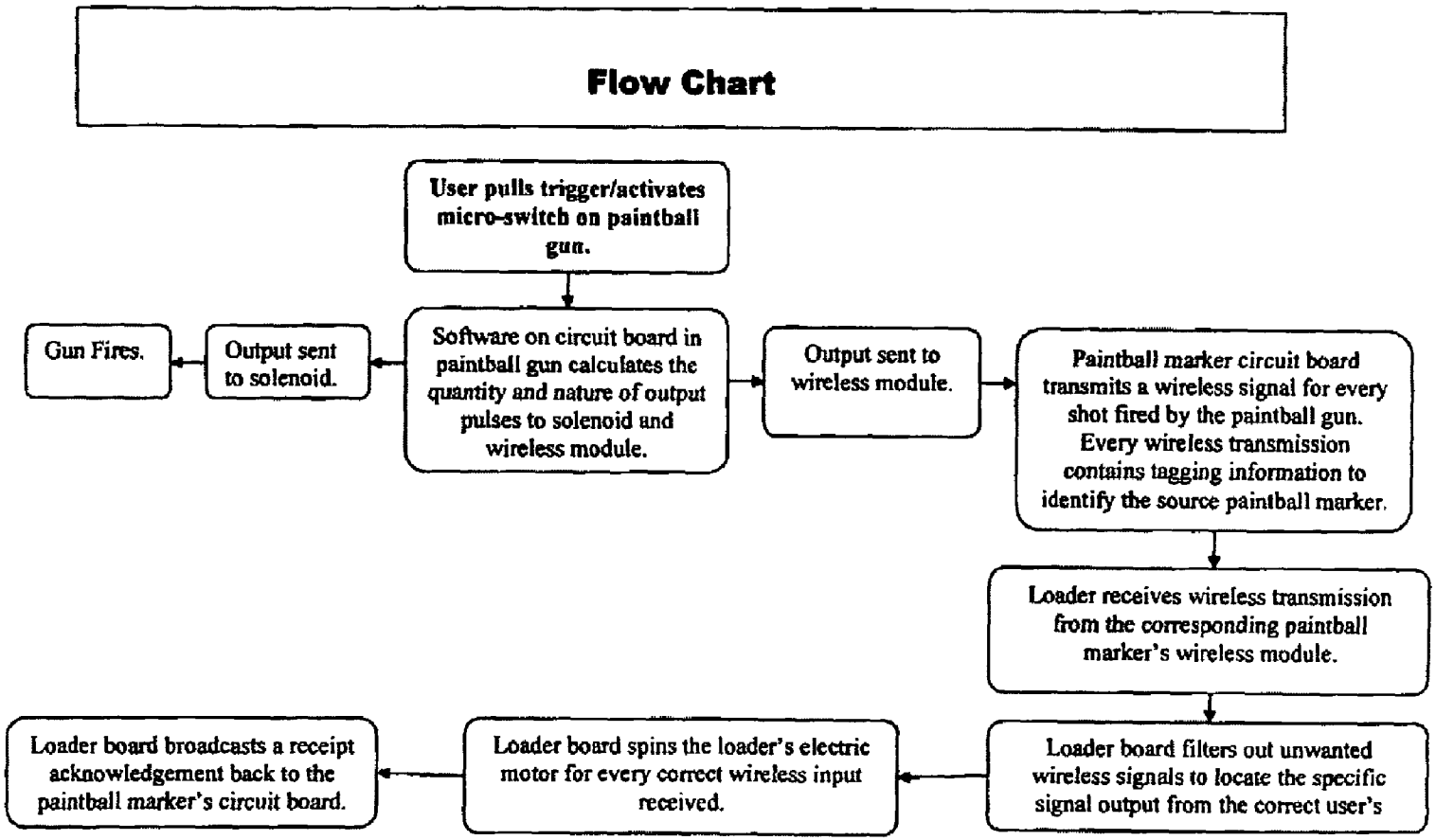
Flow Chart
User pulls trigger/activates micro-switch on paintball gun.
Software on circuit board in paintball gun calculates the quantity and nature of output pulses to solenoid and wireless module.
Output sent to solenoid.
Gun Fires.
Output sent to wireless module.
Paintball marker circuit board transmits a wireless signal for every shot fired by the paintball gun. Every wireless transmission contains tagging information to identify the source paintball marker.
Loader receives wireless transmission from the corresponding paintball marker's wireless module.
Loader board filters out unwanted wireless signals to locate the specific signal output from the correct user's
Loader board spins the loader's electric motor for every correct wireless input received.
Loader board broadcasts a receipt acknowledgement back to the paintball marker's circuit board.

PAINTBALL DEVICE AND METHOD OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority from the provisional patent application Ser. No. 60/766,648 filed Feb. 2, 2006.

STATEMENT REGARDING FEDERAL SPONSORED RESEARCH OR DEVELOPMENT

Not Applicable

REFERENCE TO SEQUENCE LISTING, ETC.

Not Applicable

BACKGROUND

This invention relates to paintball markers (hereinafter referred to as "markers") or otherwise known as paintball guns.

The competition of paintball has becoming increasingly popular in recent history. The competition involves at least two participants, each armed with a paintball marker, which fires pellets of "paint" or dye which burst upon striking a solid object to leave a mark at the point of impact. The object of the competition is to strike the other player with a paintball fired from your paintball marker before you are struck with a paintball from the other player. As competition has increased, so has the technology associated with markers.

Currently most markers use a pneumatic system for firing the paintballs using compressed air or other gases. The vast majority of paintball markers now use electronic controls to increase marker performance.

In addition to increases in efficiencies related to the markers, players are also looking to increase the number of paintballs they have available without the need to reload. This has led to a dizzying array of paintball feeding systems or paintball loaders (hereinafter referred to as "loaders") such as the Halo, Pulse, and VLocity, just to name a few. These loaders allow a participant to greatly increase the number of paintballs available before the need for reloading, which can be a hazardous activity in competition. In analogy to traditional firearms, these loaders have the effect of turning a marker from a revolver into a gun with a magazine. Unlike a traditional magazine, however, these loaders commonly use electronic controls. It is the intersection of the electronic controls found in the markers and the electronic controls found in the loaders, which gave rise to the present invention.

The present invention relates to an improved way to feed paintballs from a loader into a marker. The firing rate of markers has dramatically increased with improvements in technology and currently high-end markers cycle as fast as 30 cycles (or shots) per second (cps). The speed of the markers, however, is limited by the speed at which the loader feeds paintballs into the marker. A variety of methods have been employed to allow "passive" communication between the marker and the loader. These methods include infrared eye, reflective, break-beam, sound and weight sensors; one or more of which are disclosed by Kotsiopoulos in U.S. Pat. Nos. 6,305,367; 6,467,473; 6,488,019; 6,609,511; Rice in U.S. Pat. No. 6,941,693; Hslao in U.S. Pat. No. 6,928,999; Christopher in U.S. Pat. No. 6,502,567; Jong in U.S. Pat. No. 6,644,293.

In existing loaders and markers, there is a delay from the time the marker fires to the time the electronic circuit board in the loader acknowledges the need to feed additional paintballs into the marker. Loaders which use break-beam sensors to detect movement of the ball stack in the paintball loading device must first wait for a gap in the stack of balls before the paintball loading devices acknowledges the need to feed additional paintballs. This gap in the stack of paintballs slows down the overall feed-rate of the loader and therefore slows the marker's rate of fire. Loaders which use sound signatures to initiate the loading sequence are limited by the speed at which the sound signature travels from the marker to the loader. Other loaders which use an electric motor to apply constant pressure to the ball stack are hindered by their minimal battery life and tendency to break paintballs.

Because the speed of the loader's reaction to the firing of the marker is a limiting factor to a marker's rate of fire, an improvement in the speed, or communication, between the marker and loader can result in an increase in the marker's overall rate of fire. In view of the foregoing, there is a need to eliminate passive methods of paintball detection and move toward a more active method, which could dramatically increase marker efficiency and rate of fire.

BRIEF SUMMARY

The present invention preserves the mechanical operation of prior art paintball loading systems but can provide significant increases, via active electronic communication, in speed and responsiveness of markers and loaders in comparison to prior art systems. By using wireless communication between the marker and loader, the present invention significantly reduces the time which the circuit board in the loader sits idle before acknowledging that the marker it is attached to has fired and thus, the need for the loader to load additional paintballs into the marker. While this active communication could be gained via a hard-wire between the marker and loader, the weaknesses and potential for breakage are eliminated with the elimination of the wire. Unlike prior art devices, this invention allows the marker to send a wireless signal to the loader; therefore, the loader device begins placing additional paintballs into the marker virtually instantaneously.

Wireless communication between the marker arid loader is achieved by attaching a wireless transceiver, transmitter, or receiver to both the marker and loader via direct attachment to a circuit board or otherwise nearby placement.

It is therefore an object of the present invention to provide a device and method of using wireless technologies to initiate the loading sequence of a paintball loader.

It is a further object of the present invention to provide an alternative input for the electronic circuit board(s) of a loader to increase the loaders overall loading speed.

It is a further object of the present invention to provide an alternative output for the electronic circuit board(s) of the marker to control the device's wireless operation.

These and other features, aspects and advantages of the present invention will become better understood with reference to the following description, appended claims and accompanying drawing.

BRIEF DESCRIPTION OF THE DRAWINGS

FIG. 1: shows a flow chart illustrating one claimed embodiment of the present invention.

DESCRIPTION

This invention provides a means for wireless communication between the electronics in a paintball marker or gun ("marker") and paintball loader ("loader"). The wireless communication between the marker and loader may include digital, analog, or optical means.

In well known and common markers, an electronic circuit board resides within the marker. This circuit board accepts trigger and button inputs, alters and filters the inputs as necessary, and sends an electronic output to the marker's solenoid to control the marker's firing sequence. The preferred embodiment of the present invention provides for an additional output from the marker's electronic circuit board(s). This additional output may be broadcast by a wireless transceiver or transmitter contained in the marker. In the circumstance where the wireless transceiver or transmitter resides outside of the marker's primary electronic circuit board(s), the transceiver or transmitter will likely use the markers circuit boards' solenoid outputs to control the transceiver or transmitter's wireless operation.

In well known and common loaders, an electronic circuit board resides within the loader. This circuit board accepts inputs from break-beam sensors or other sources, alters and filters the inputs as necessary, and sends an electronic output to the loader's electronic motor. The output from the loader causes an electric motor to spin. The loader's motor is directly or indirectly connected to paddles which spin to agitate or force the paintballs into a conduit or directly into the marker. The preferred embodiment of the present invention allows for an additional wireless input to the loader's electronic circuit board. This input may either replace inputs used in prior art configurations or be used in addition to the inputs used in prior art loaders. The additional input will exist as a wireless transceiver or receiver contained in the loader. In the circumstance in which the wireless transceiver or receiver resides outside of the loader's primary electronic circuit board, the transceiver or receiver will likely utilize existing inputs on the loader's circuit board to interface with the loader's electronic circuit board(s).

The wireless components in the marker and loader must first establish a common frequency or address to prevent unintended interference from other units. After this common address or frequency is established, the marker wirelessly transmits a signal to the paintball loading device before, during, or after the marker's firing sequence. This wireless broadcast may be started, aborted, or repeated at any point throughout the marker's firing cycle. In the preferred embodiment, the marker will broadcast to the loader approximately once per firing cycle.

Once the loader's wireless components receive the wireless signal from the marker, the loader's electronic circuit board(s) choose to process or ignore the wireless signal. If the loader chooses to accept and process the wireless signal from the marker, the electronic circuit board(s) on the loader will directly or indirectly send a signal to the loader's electronic motor. At this point, the prior art loading sequence resumes as the loader proceeds to feed a singular or plurality of paintballs into the marker or appropriate conduit. After receipt of the wireless transmission from the marker, the loader could, but not necessarily need to, transmit a wireless response to the marker to acknowledge receipt of the wireless signal. The utilization of the preferred embodiment of the present invention eliminates the need for "passive" sensors and streamlines communication between the marker and loader.

Although the present invention has been described in considerable detail with reference to certain preferred versions thereof, other versions are possible. Therefore, the spirit and scope of the appended claims should not be limited to the description of the preferred versions contained herein.

What is claimed is:

1. A paintball device comprising:

a) a paintball marker or gun ("marker") with a circuit board, a wireless transceiver and trigger each electronically connected to said marker circuit board, said marker including electronic tagging information;

b) a paintball loading device ("loader") which is physically attached to the marker, said loader having a wireless transceiver but not otherwise electronically connected to said marker, said loader further having a circuit board;

c) a means in which the marker can wirelessly transmit information to the loader which the loader may act upon, and cause paintballs to be loaded into the marker, said means including software in said marker circuit board that, when said marker circuit board receives an input, sends an output to said marker transceiver reflecting at least one or more paintballs, and said marker transceiver adapted to broadcast at least one signal including at least information representing said number and said marker tagging information, and said loader transceiver adapted to receive said at least one broadcast signal, and said loader circuit board being programmed to process any broadcast signal including said marker tagging information to cause said number of paintballs to be loaded into said marker, and to ignore any broadcast signal that does not include said marker tagging information.

2. The device of claim 1 wherein the wireless transmission is digital, analog or optical.

3. The device of claim 1, wherein said output reflecting at least one or more paintballs is a desired rate of fire for said marker.

4. A paintball device, comprising:

a paintball marker;

a paintball loader connected to said marker;

wherein said marker has a trigger electronically connected to an internal electronic circuit board, said circuit board programmed with a number of shots to be fired for each trigger activation, said circuit board further having transceiver integrated therein and tagging information identifying a relationship between said marker and said loader, said marker circuit board adapted to accept an electronic input representing a trigger activation and send one or more signals based on said electronic input to said marker transceiver reflecting at least said number, and wherein said loader has a motor for feeding paintballs and an internal electronic circuit board with an integrated transceiver, said loader circuit board programmed to recognize said tagging information of said marker, and said loader having tagging information identifying a relationship between said loader and said marker, wherein said marker transceiver is adapted to broadcast at least one signal that represents said number and includes said marker tagging information, wherein said loader transceiver is adapted to receive over-the-air signals including said at least one broadcast signal, said loader circuit board being adapted to accept and process signals having said marker tagging information and to ignore at least some signals that do not have said marker tagging information, and to act on said at least one broadcast signal from said marker so that said motor feeds said number of paintballs.

5. The apparatus of claim 4, wherein said loader transceiver is adapted to broadcast at least one acknowledgment signal that acknowledges said at least one broadcast signal from said marker and includes said loader tagging information, and wherein said marker transceiver is adapted to receive said at least one acknowledgment signal.

6. The apparatus of claim 4, wherein said marker circuit board programming includes software to determine a number of paintball shots to be fired for each trigger activation.

7. The apparatus of claim 4, wherein said marker tagging information is information identifying said marker.

8. The apparatus of claim 4, wherein said marker includes a solenoid and the output of said solenoid causes said marker to fire, and wherein said circuit board is adapted to send one or more signals to said solenoid based on said electronic input so as to fire one or more paintballs.

9. The apparatus of claim 4, wherein said marker tagging information and said loader tagging information are at least substantially identical.

10. The apparatus of claim 4, wherein said marker tagging information is an address reflecting said marker and said loader tagging information is an address reflecting said loader.

11. A method comprising:

providing a paintball marker having an internal circuit board and a solenoid, said solenoid for controlling firing of said marker;

providing a paintball loader having an internal circuit board;

establishing tagging information identifying a relationship between said marker and said loader, and providing said tagging information to said marker and loader;

when said marker circuit board receives a firing input signal, said circuit board of said marker sends a first output of one or more signals to said marker solenoid to fire a number of paintballs from said marker, and a second output of one or more signals and indicating said number of paintballs is sent to said marker transceiver;

broadcasting a first signal from said marker transceiver, said first signal including tagging information and information regarding said second output;

receiving one or more broadcast signals including said first signal by said loader transceiver;

analyzing said broadcast signals by said loader circuit board to determine whether said tagging information is present, and process any signals including said first signal that includes said tagging information, resulting in feeding said number of paintballs toward or into said marker.

12. The method of claim 11, further comprising broadcasting a second signal from said loader transceiver, said second signal including said tagging information and information regarding said processing of said first signal.

13. The method of claim 12 whereby the entire process for operation of the paintball device may be started, aborted, or repeated at any point throughout the marker's firing cycle.

14. The method of claim 12 whereby the entire process may be started, completed, or aborted a plurality of times per singular firing cycle.

15. The method of claim 12 whereby wireless signal initiation is from a transceiver wired among the primary paintball marker circuit board(s) or the paintball marker's solenoid(s).

16. The method of claim 11, further comprising receiving said second signal by said marker transceiver, wherein said marker transceiver analyzes said second signal for said tagging information, and processes said second signal.

17. The method of claim 11, wherein said marker circuit board sends said second output.

18. The method of claim 11, wherein said second output is an output of said solenoid.

19. The method of claim 11, wherein said first and second outputs occur substantially simultaneously.

20. The method of claim 11, wherein said second output occurs prior to said first output.

*21. A paintball system, comprising:*

*a paintball marker having a trigger electronically connected to an electronic circuit board, said circuit board programmable with a number of shots to fire for each trigger activation, said marker further having a wireless transmitting component and tagging information identifying said marker;*

*a paintball loader connected to said marker, said loader having a receiving component, a motor for feeding paintballs and an electronic circuit board, said loader programmed to recognize said marker tagging information,*

*wherein said transmitting component is adapted to transmit at least one signal following activation of said trigger that represents a number of paintballs fired by the activation of said trigger and said marker tagging information,*

*wherein the receiving component is adapted to receive said at least one signal, and said loader is adapted to recognize said marker tagging information and instruct said motor to feed said number of paintballs based on the signal.*

*22. The paintball system of claim 21, wherein said transmitting component is at least one of a transceiver and a transmitter.*

*23. The paintball system of claim 21, wherein said receiving component is at least one of a transceiver and a receiver.*

*24. The paintball system of claim 21, wherein said transmitting component is a part of said marker circuit board.*

*25. The paintball system of claim 21, wherein said receiving component is a part of said loader circuit board.*

*26. A paintball device comprising:*

*a paintball marker with a circuit, a wireless transmitting component and trigger each electronically connected to said marker circuit, said marker including electronic tagging information;*

*wherein when said marker circuit receives an input from said trigger, said marker circuit sends an output to said marker transmitting component reflecting operational data of said marker, and said marker transmitting component adapted to transmit at least one signal including at least information representing said operational data and said marker tagging information.*

*27. The paintball device of claim 26, wherein at least one of said circuit and said transmitting component is part of a circuit board.*

*28. The paintball device of claim 26, further comprising a loader that is physically attached to the marker, said loader having a circuit and a wireless receiving component.*

*29. The paintball device of claim 28, wherein said receiving component is at least one of a receiver and transceiver.*

*30. The paintball device of claim 26, wherein said transmitting component is at least one of a transmitter and transceiver.*

*31. The paintball device of claim 26, wherein said operational data includes at least an indication of a number of paintballs fired resulting from a particular activation of said trigger.*

* * * * *